Dec. 12, 1967  H. PECHTHOLD  3,357,046
APPARATUS FOR THE AUTOMATIC CONTINUOUS MANUFACTURE
OF FILLED AND CLOSED CONTAINERS
Filed July 7, 1965

Inventor
Heinz Pechthold
By
Wenderoth, Lind & Ponack
Attorneys

Dec. 12, 1967   H. PECHTHOLD   3,357,046
APPARATUS FOR THE AUTOMATIC CONTINUOUS MANUFACTURE
OF FILLED AND CLOSED CONTAINERS
Filed July 7, 1965   7 Sheets-Sheet 3

Inventor
Heinz Pechthold
By
Wenderoth, Lind & Ponack
Attorneys

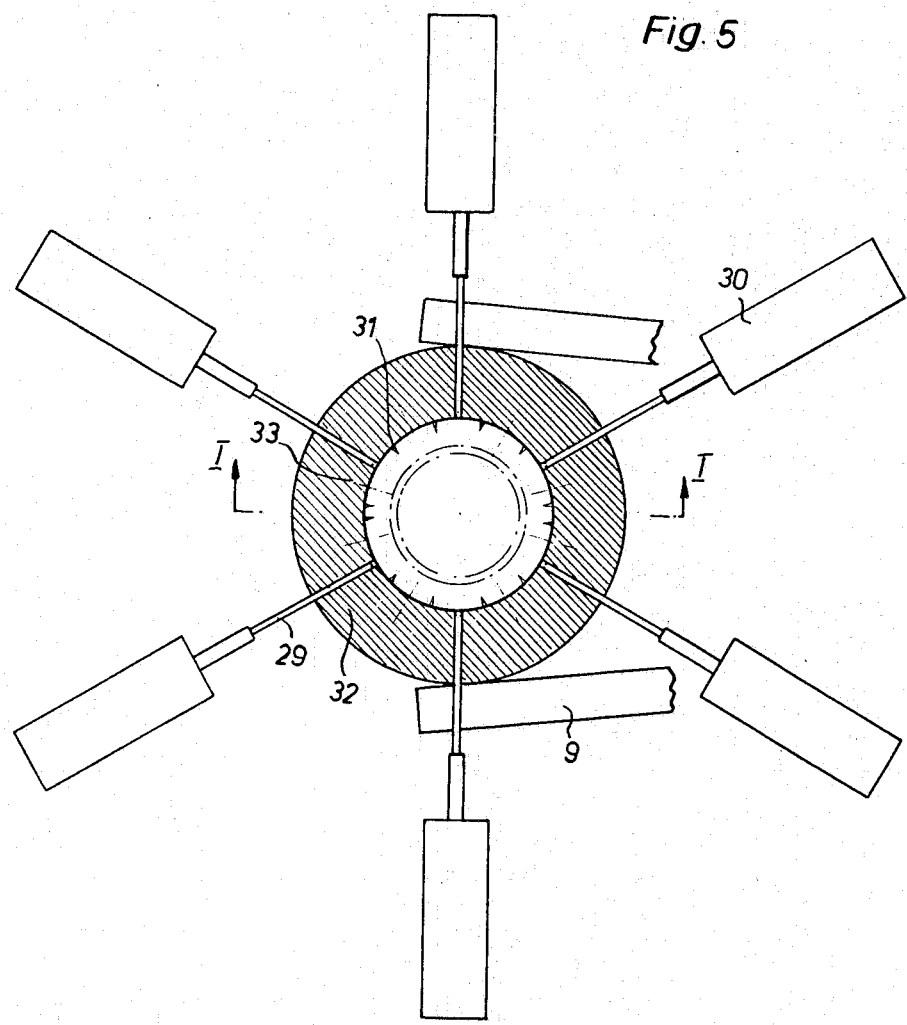

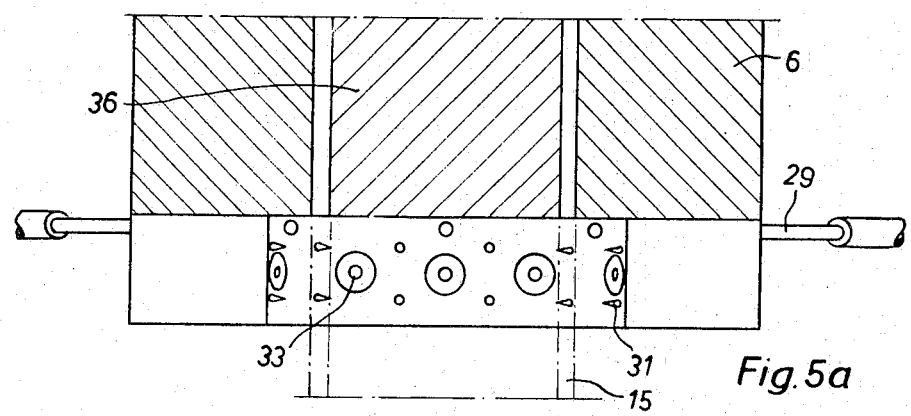
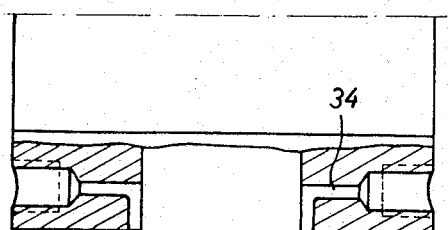
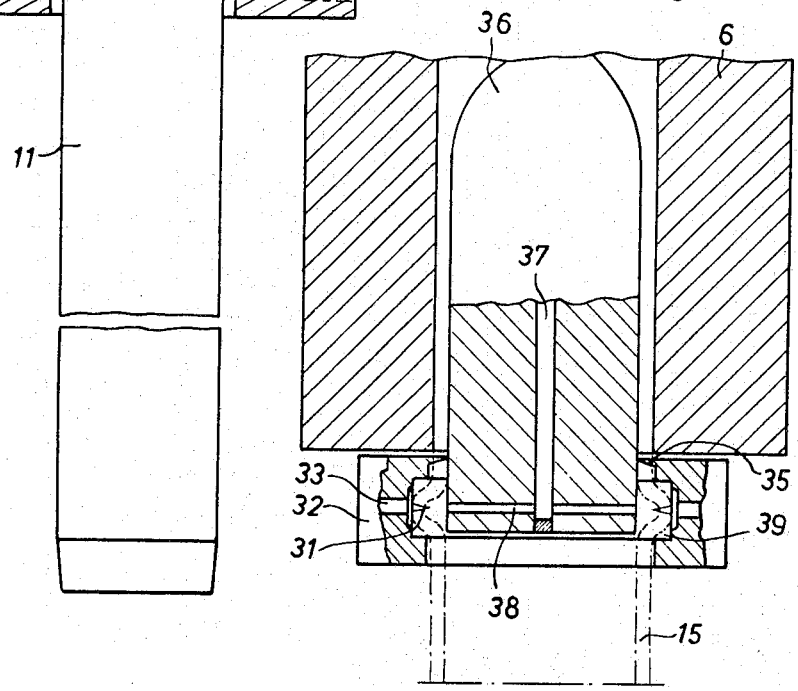

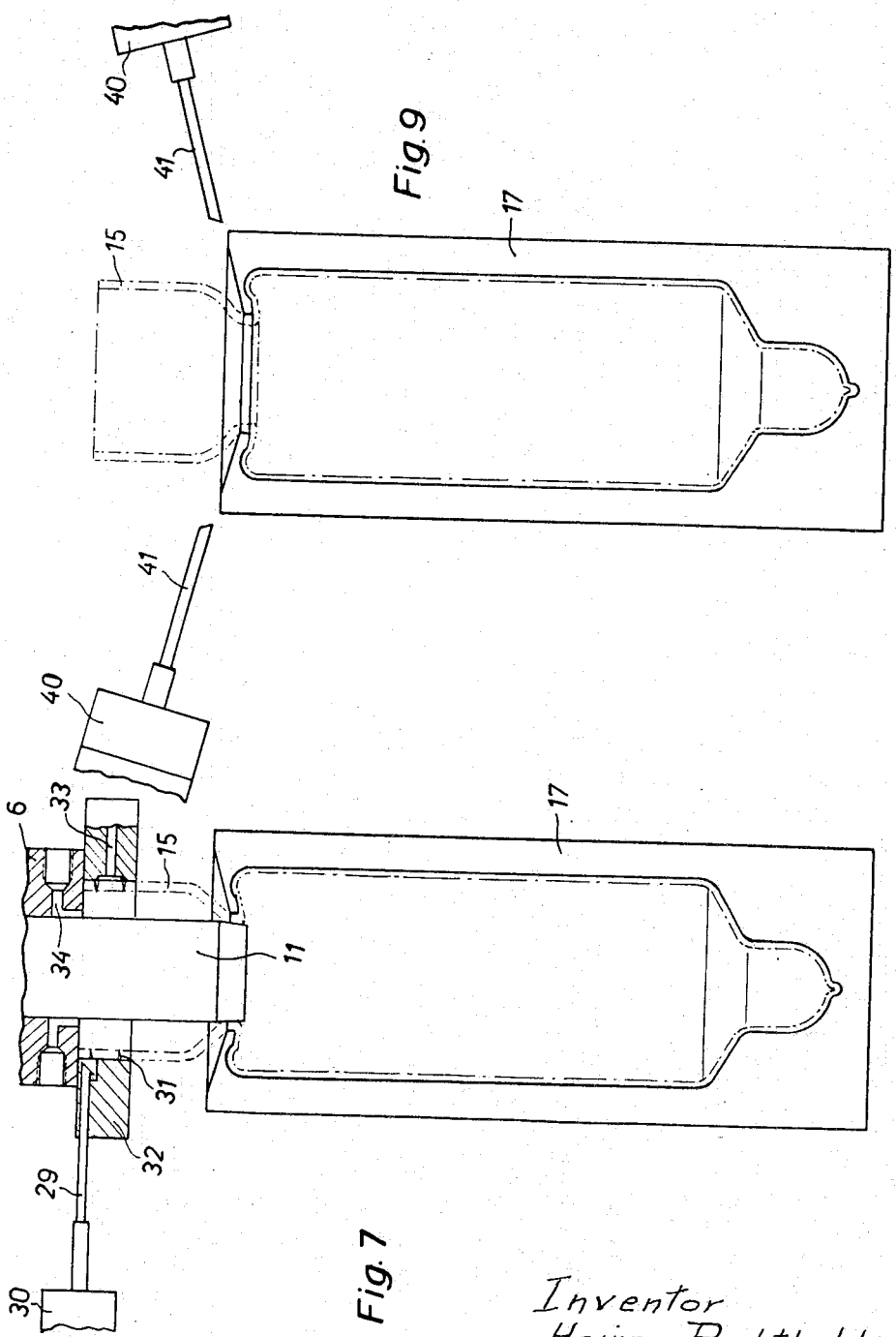

United States Patent Office 3,357,046
Patented Dec. 12, 1967

3,357,046
APPARATUS FOR THE AUTOMATIC CONTINUOUS MANUFACTURE OF FILLED AND CLOSED CONTAINERS
Heinz Pechthold, Mudau, Odenwald, Germany, assignor to Etablissement Bonatex, Vaduz, Liechtenstein
Filed July 7, 1965, Ser. No. 470,122
Claims priority, application Austria, July 7, 1964, A 5,821/64
6 Claims. (Cl. 18—5)

The present invention relates to apparatus for the automatic continuous manufacture of filled and closed containers of thermoplastic material by the method of filling under pressure. The apparatus is particularly adapted for the manufacture of containers of all kinds, as for example bottles, cans, canisters, ampules, tubes etc., also for containers having large dimensions, from a hollow body enclosed in moldable condition in a mold and made of thermoplastic material, which is expanded in a single operation, substantially by charging of the filling material, the hollow body being urged against and formed on, the walls of the hollow space of the mold, whereupon the container thus formed and filled is closed and removed from the mold.

The principles of the compression filling method for the manufacture of containers of the said type are nowadays thoroughly familiar to the man skilled in the art. They are described, e.g., in the French patent specification No. 1,338,656. It was, however, not possible up to now to attain a great number of units or an efficient manufacturing speed with a single machine, since the individual process steps require a certain time. In order to remedy this condition, apparatus was already proposed, with which one or several stationary plastification units were provided, to which periodically individual working stages, consisting of molding, filling and closing units are supplied. Although the attained number of manufactured pieces could be substantially increased, the apparatus was not completely satisfactory, since it required considerable space and was subject to break-downs owing to its relatively complicated mechanical structure. Thus, upon failure of a single operating station, for example, the whole machine had to be stopped. Also considerable energy was required to accelerate or to brake the traveling working stages.

It is an object of the invention to provide apparatus with which the above outlined deficiencies are at least partly eliminated.

Another object of the invention is the provision of apparatus of compact structure, short switching times between the successive operations and sufficient operating time for the forming, filling and closure of the manufactured containers.

A further object is the provision of apparatus having a high production capacity and producing even voluminous hollow bodies rationally and cheaply, and to mold, fill and close the containers in a single operation.

According to the invention a plurality of stationary working stages each including molding, filling and closing units are disposed around a tube extruder rotatably mounted on a vertical axis, said working stages including severing and holding means for receiving and transporting severed sections of the extruded tube into the molding unit.

Embodiments of apparatus according to the invention are illustrated in the accompanying drawings:

FIG. 5 shows a severing and holding device, with severing rams, annular duct suction holes and holding pins;

FIG. 5a is a section along the line I—I of FIG. 5;

FIG. 6 shows a filling mandrel with an annular nozzle and hot air ducts;

FIG. 7 shows a mold with an inserted tube section, a severing and holding device according to FIG. 5, and an annular filling mandrel and hot air nozzle according to FIG. 6;

FIG. 8 is a sectional view of another embodiment of the holding device having a cutting edge, holding pins and annular duct;

FIG. 9 shows a container closing unit with welding and cutting means.

Figure 1:
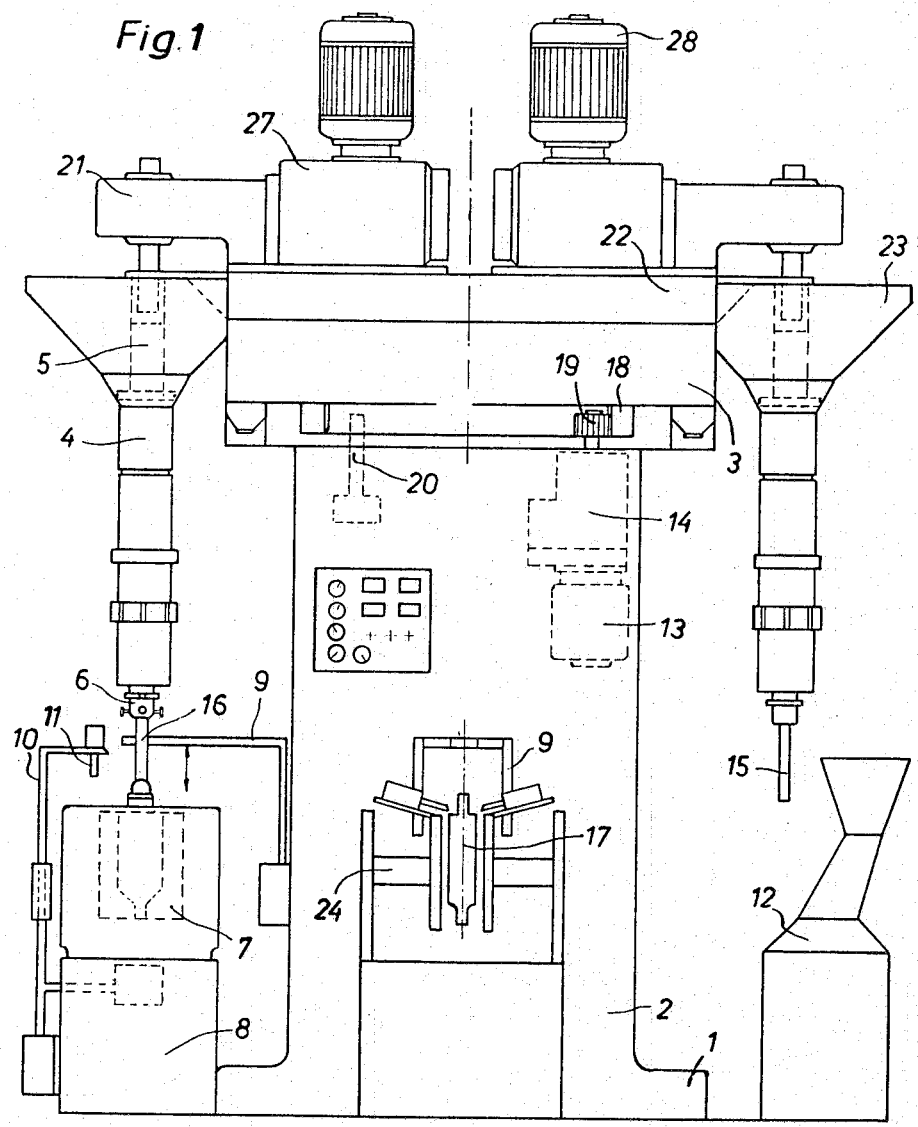
FIG. 1 is a diagrammatic view in elevation of apparatus having vertically disposed extruders.
Figure 2:
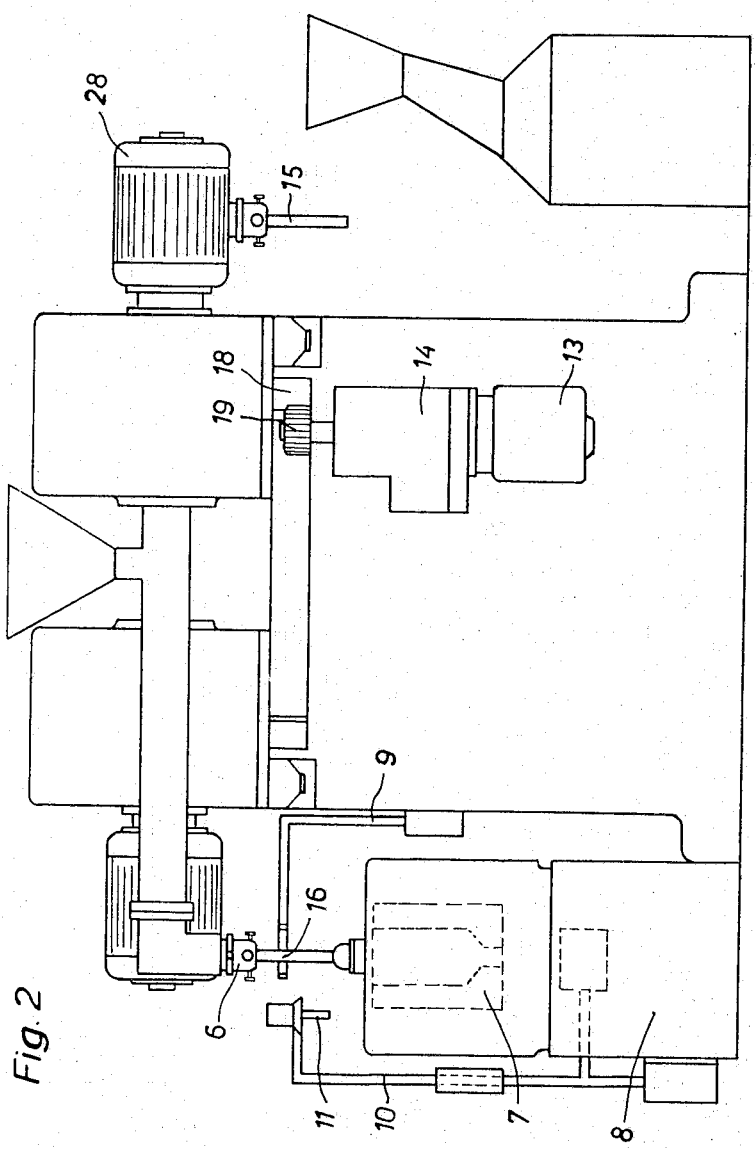
FIG. 2 is a view similar to FIG. 1, of apparatus having horizontally mounted extruders.

According to FIGS. 1 and 2 the frame of the machine shown is substantially formed of a base plate 1 and of four columns 2 for supporting the independently driven rotatable carrier 3. Two extruders 4 having vertical cylinders 5, extruder heads 6 and infinitely variable gear drives 27 and motors 28 are mounted diametrally opposite one another on the carrier 3. At least one molding and closing unit 7 and 8, a severing and holding device 9, and a receiving device 10 for a filling tube 11 are disposed in a circle around the axis of rotation of the carrier 3 and the base 1. The filling tube 11 is supplied from a filling and measuring apparatus 12.

The closing unit 8 and the molding unit 7 with the mold 17, which is divided to allow opening and closing, are actuated by a device 24.

The carrier 3 with the extruders is driven by a motor 13 via an infinitely variable drive gear 14 and rotated about a vertical axis, in order to bring the extruded tube portion 16 into proximity of the severing and holding device 9. For obtaining the movement of rotation (FIGS. 1 and 2) an internal gear rim 18 is provided which meshes with a drive pinion 19 connected to the gear 14. When the rotating extruders mounted on the carrier 3 arrive exactly over the severing and holding devices 9 of the working stages, the carrier 3 may be locked in this position, e.g. by a stop bolt 20. After severing of the tube portion 15, the stop bolt 20 is unlocked and the carrier 3 continues its movement of rotation. The conventional screw conveyer of the extruder is driven by means of motor 28, a first infinitely variable drive gear 27, and a second drive gear 21. These two driving members are supported on an attachment 22 mounted on the carrier 3. For charging the plastic material to be processed into the extruders, hoppers 23 are provided, which are directly discharge into the cylinders 5, containing the screw conveyers.

In operation the carrier 3 together with both extruders moves almost continuously, or intermittently about its axis of rotation, while the extruders preferably operate continuously. The severing and holding device 9 is pivotally movable into and out of the path of motion of the extruded tube portions 16 in order to sever a tube section from the extruded tube, as will be described later, and to insert it into the opened mold indicated at 7. The severing and transferring of a tube section can take place upon momentary stoppage or even without stoppage of the extruder, the movement of which may be slowed down during this operation. It is possible, for example, to provide an arrangement with which the severing and holding tools move on a circular arc or similar path which at a point contacts the path of motion of the extruded tube these severing and holding tools being moved in synchronism with rotary movement of the tube portion, so that they meet the tube portion in the range of contact of the two paths and thus have at least temporarily the same velocity as the extruder. The meeting of the extruded tube and of the severing and holding tools and their successive separation could also be effected in such manner that these members overtake the tube portion as a consequence of their greater velocity and after transfer of the tube portion are left behind by the extruder owing to slowing down their own motion or acceleration of the extruder movement.

Following the transfer of a tube position the holding members first move horizontally in order to position the tube portion above the opened mold, whereupon it moves downwards to be inserted into the mold. The movement of the filling tube 11 is correspondingly synchronized with the above described movements of the severing and holding device and the extruded tube portion, the filling tube first moving horizontally and then vertically, in order to penetrate from above into the tube portion, this movement being initiated preferably already during the movement of the extruded tube portion. In any case the time interval between attainment of the respective end positions of the tube portion and of the filling tube is held as short as possible.

Thereupon, the mold is closed and the tube portion sealed at its bottom end by the mold, is shaped by application of the pressure filling method known per se, simultaneously with introducing the filling material, and finally the molded container is closed. This method is, as already mentioned, described in detail in the French patent specification aforesaid.

Figure 3:
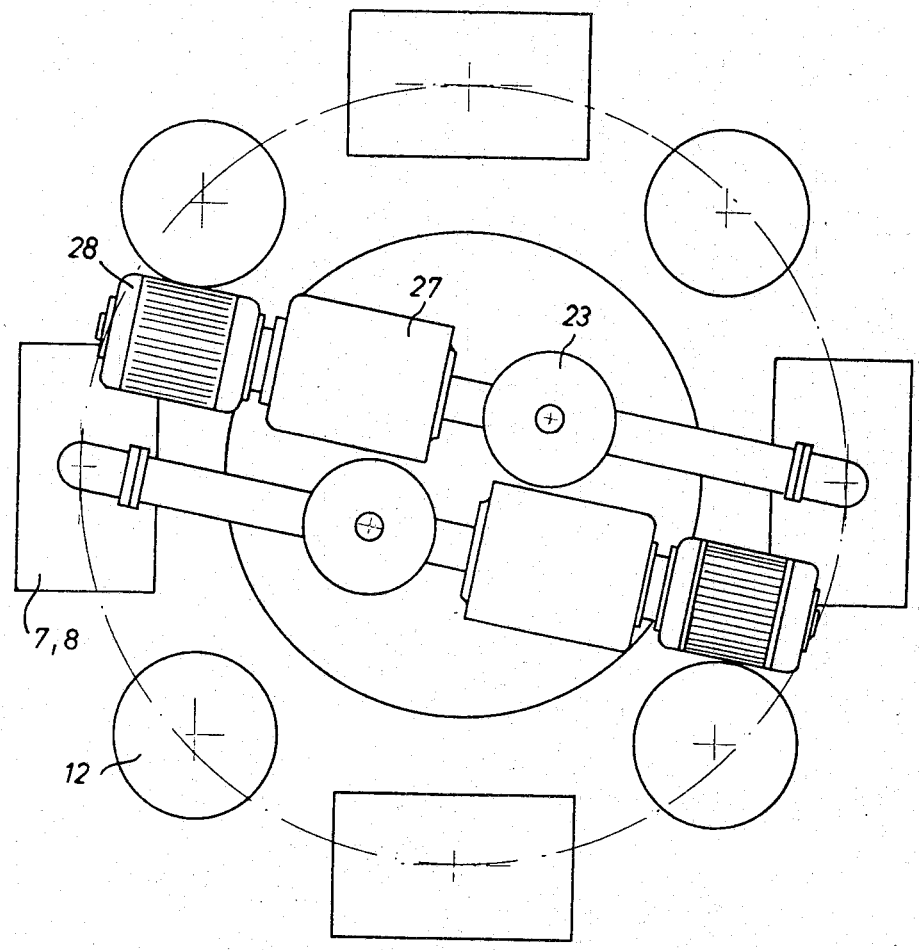
FIG. 3 is a plan view of apparatus having four working stages, molding and closing units, filling means and horizontally mounted extruders being diagrammatically shown.
Figure 4:
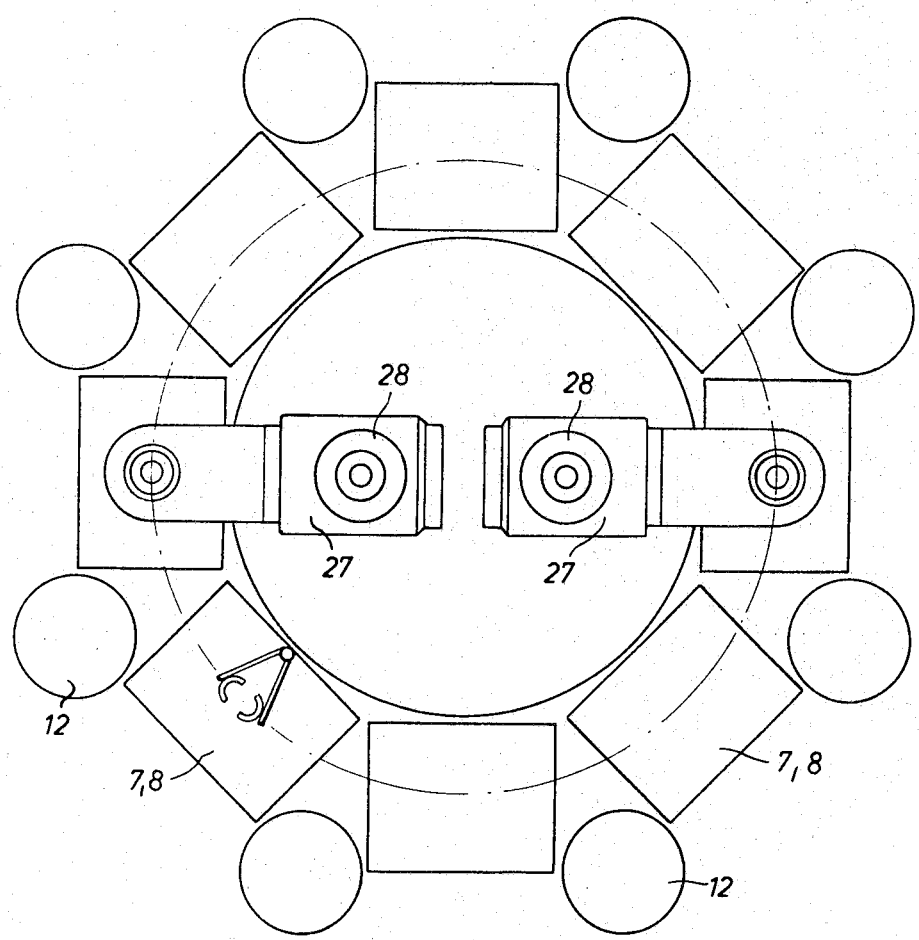
FIG. 4 is a view similar to FIG. 3, of a eight-stage machine with vertically disposed extruders.

Multiple stage machines of the described kind are drawn purely diagrammatically in FIGS. 3 and 4, in top plan view.

FIGS. 5 and 5a show a severing and holding device 9 which travels at a given moment under the extruder. The severing rams 29 are preferably provided with hook-shaped ends which penetrate into the tube portion 15, and are then retracted by the action of a cylinder 30 and attach the tube to holding points 31 in the holding ring 32. The latter is provided with an annular duct having perforations 33 communicating with a vacuum space (viz, also FIG. 8). Now, the severing and holding device 9 leads the tube portion 15, into the interior 16 of which the filling tube 11 was introduced in the mean time, by means of the device 10, into the mold 17 of the molding unit 7 forming a part of the closing unit 8.

FIG. 6 shows the filling tube 11 with an annular nozzle which is provided with borings 34 for blowing in hot air. This air serves, on the one hand, to hold the temperature of the upper end of the tube portion sufficiently high in order that later, upon sealing the container, a secure welding of the plastic material is obtained and, on the other hand, in order to press the upper end of the tube portion firmly onto the holding ring 32.

FIG. 7 shows a tube portion fitted into the mold 17, as well as a filling tube and a severing and holding device of the above described kind.

For small containers, in place of the severing and holding device shown in FIG. 5, means as in FIG. 8 can be used. As described above, after the holding device has travelled underneath the extruder head 6, the holding ring 32 formed with a cutting edge 35, severs the tube portion 15 on the extruder core 36. The core 36 is provided with an axial central duct 37 and radial ducts 38 extending outwardly in the lower part of the core. During the severing operation compressed air is blown in and the tube portion 15 is pressed into the annular duct 39 of the holding ring 32 and upon the holding points 31 as well as towards the suction holes 33. Subsequently the tube portion 15, as described above, is brought into the mold 17 while at the same time the filling tube is introduced.

The container closing and sealing means shown in FIG. 9 consists substantially of two knife-like tools 41 actuated by pneumatic or hydraulic cylinders 40, which are advanced by sliding close above the mold 17. The tube portion 15 projecting beyond the mold 17, is pressed together and owing to its still plastic condition is welded, whereby the container is closed and sealed.

It is to be noted that here the containers within the mold have their neck portion pointing downwards, a closure cap being formed at this end. The closing and sealing of the filled containers takes place at the bottom end which in the mold is situated on the top.

I claim:

1. In apparatus for the automatic continuous production of filled and sealed containers formed by hollow bodies of thermoplastic material inserted in a mold in moldable condition, which bodies are expanded by the pressure filling method and the walls thereof applied against the wall of the mold, whereafter the molded and filled containers are sealed and removed from the mold, a tube extruder rotatable about a vertical axis, a plurality of stationary working stages each including molding, filling and sealing units disposed around said tube extruder, said units being equipped with conveyer means including tube severing and holding means for transferring sections of the extruded tube into said mold.

2. Apparatus as defined in claim 1, wherein each stage comprises at least one hollow vertically divided mold, and a severing and holding device pivotally mounted to swing to operative position above the mold and provided with a severing ram and a holding ring for holding the tube portion required for forming the container and severing the tube portion from the tube discharging from the extruder and transferring the same into the mold.

3. Apparatus as defined in claim 2 comprising at least one filling and venting pipe is provided for introduction into the severed tube portion which is open at the upper end, an annular nozzle being preferably provided by means of which hot air is blown in between the pipe wall and the tube.

4. Apparatus as defined in claim 3, in which the annular nozzle is secured onto the filling pipe and is supported on the severing and holding device.

5. Machine as defined in claim 1, in which bottle-shaped hollow molds point with the neck downwardly, a closure cap being formed on this end, while the sealing takes place by welding of the filled container the bottom of which is situated at the top of the vertically disposed mold.

6. Apparatus as defined in claim 1 and comprising a severing and holding device for severing the tube portion on the extruder required for the molding of the container, an annular duct provided with holding points being disposed along the interior surface of the holding ring, into which duct the upper end of the severed tube portion is pressed by means of compressed air, the holding ring being provided with borings leading to the annular duct for additionally holding the tube portion by means of suction air.

References Cited

UNITED STATES PATENTS

| 2,858,564 | 11/1958 | Sherman et al. | 18—5 X |
| 3,154,809 | 11/1964 | Fischer | 18—5 |
| 3,243,847 | 4/1966 | Fogelberg et al. | 18—5 |

J. SPENCER OVERHOLSER, Primary Examiner.

WILBUR L. McBAY, Examiner.